US012061939B2

United States Patent
Kansal et al.

(10) Patent No.: US 12,061,939 B2
(45) Date of Patent: Aug. 13, 2024

(54) CHIP-TO-CHIP INTERCONNECT WITH A LAYERED COMMUNICATION ARCHITECTURE

(71) Applicant: Meta Platforms, Inc., Menlo Park, CA (US)

(72) Inventors: Pankaj Kansal, Fremont, CA (US); Arvind Srinivasan, San Jose, CA (US); Harikrishna Madadi Reddy, San Jose, CA (US); Naader Hasani, Menlo Park, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 17/824,766

(22) Filed: May 25, 2022

(65) Prior Publication Data

US 2023/0385138 A1     Nov. 30, 2023

(51) Int. Cl.
*G06F 16/23*     (2019.01)
*G06F 9/30*      (2018.01)
*G06F 9/54*      (2006.01)

(52) U.S. Cl.
CPC ............ *G06F 9/546* (2013.01); *G06F 9/3005* (2013.01); *G06F 9/544* (2013.01)

(58) Field of Classification Search
CPC ......... G06F 9/546; G06F 9/3005; G06F 9/544
See application file for complete search history.

(56) References Cited

U.S. PATENT DOCUMENTS

| 11,177,969 | B2* | 11/2021 | Taki ........................ H04W 4/24 |
| 11,847,489 | B2* | 12/2023 | Batley ................. G06F 13/4282 |
| 2008/0072098 | A1* | 3/2008 | Hunsaker ................ H04L 47/39 |
| | | | 710/29 |
| 2017/0195227 | A1* | 7/2017 | Wang ................. H04L 47/6275 |
| 2019/0028575 | A1* | 1/2019 | Wetterwald ............ H04L 41/34 |
| 2019/0281025 | A1  | 9/2019 | Harriman et al. |
| 2021/0174174 | A1  | 6/2021 | Zhu et al. |
| 2021/0200610 | A1* | 7/2021 | Chu ........................ H04L 69/04 |

(Continued)

OTHER PUBLICATIONS

Nikolay Sinyov et al "Research and Analysis of Flow Control Mechanism for Transport Protocols of the SpaceWire Onboard Networks", (Year: 2016).*

(Continued)

*Primary Examiner* — Timothy A Mudrick
*Assistant Examiner* — Abdou K Seye
(74) *Attorney, Agent, or Firm* — Mannava & Kang, P.C.

(57) ABSTRACT

A system includes a first integrated circuit package including a first group of one or more artificial intelligence processing units and a first chip-to-chip interconnect communication unit and a second integrated circuit package including a second group of one or more artificial intelligence processing units and a second chip-to-chip interconnect communication unit. The system also includes an interconnect between the first integrated circuit package and the second integrated circuit package, wherein the first chip-to-chip interconnect communication unit and the second chip-to-chip interconnect communication unit manage ethernet-based communication via the interconnect using a layered communication architecture supporting a credit-based data flow control and a retransmission data flow control.

20 Claims, 14 Drawing Sheets

(56) References Cited

U.S. PATENT DOCUMENTS

2022/0070107 A1\* 3/2022 Pospesel ............... H04L 47/527
2022/0200900 A1\* 6/2022 Roweth .................. H04L 47/32

OTHER PUBLICATIONS

Defilippi J., et al., "CCIX: A New Coherent Multichip Interconnect for Accelerated use Cases," Arm Tech Con, 2017, 35 pages.
Firuzan A., et al., "Reconfigurable Network-on-Chip for 3D Neural Network Accelerators," 2018 Twelfth IEEE/ACM International Symposium on Networks-on-Chip (NOCS), 2018, 8 pages.
Nabavinejad S.M., et al., "An Overview of Efficient Interconnection Networks for Deep Neural Network Accelerators," IEEE Journal on Emerging and Selected Topics in Circuits and Systems, 2020, vol. 10, No. 3, 16 pages.
Shantharama P., et al., "Hardware-Accelerated Platforms and Infrastructures for Network Functions: A Survey of Enabling Technologies and Research Studies," IEEE Access, 2020, vol. 8, pp. 132021-132085.
Xiao S., et al., "Neuronlink: An Efficient Chip-to-Chip Interconnect for Large-Scale Neural Network Accelerators," IEEE Transactions on Very Large Scale Integration (VLSI) Systems, 2020, vol. 28, No. 9, pp. 1-13.
IEEE Std 802.3TM-2018., "IEEE Standard for Ethernet," IEEE Standards Association, Aug. 31, 2018, pp. 1-5600.
International Search Report and Written Opinion for International Application No. PCT/US2023/023450, mailed Sep. 25, 2023, 9 pages.

\* cited by examiner

CHIP-TO-CHIP INTERCONNECT WITH A LAYERED COMMUNICATION ARCHITECTURE

BACKGROUND OF THE INVENTION

Data centers are facilities that house computer systems and components, such as computational systems, data storage systems, and other associated components. Modern applications, such as training of artificial intelligence (AI) models, have pushed the demand for high network, storage, and compute capabilities in data centers. Large numbers of processing units are oftentimes connected for large-scale computing tasks. However, these processing units are oftentimes connected in a manner that does not scale well with network speed growth and/or involves cumbersome communication protocols. Thus, it would be beneficial to develop techniques directed toward flexible and scalable chip-to-chip interconnection.

BRIEF DESCRIPTION OF THE DRAWINGS

Various embodiments of the invention are disclosed in the following detailed description and the accompanying drawings.

DETAILED DESCRIPTION

Figure 1:
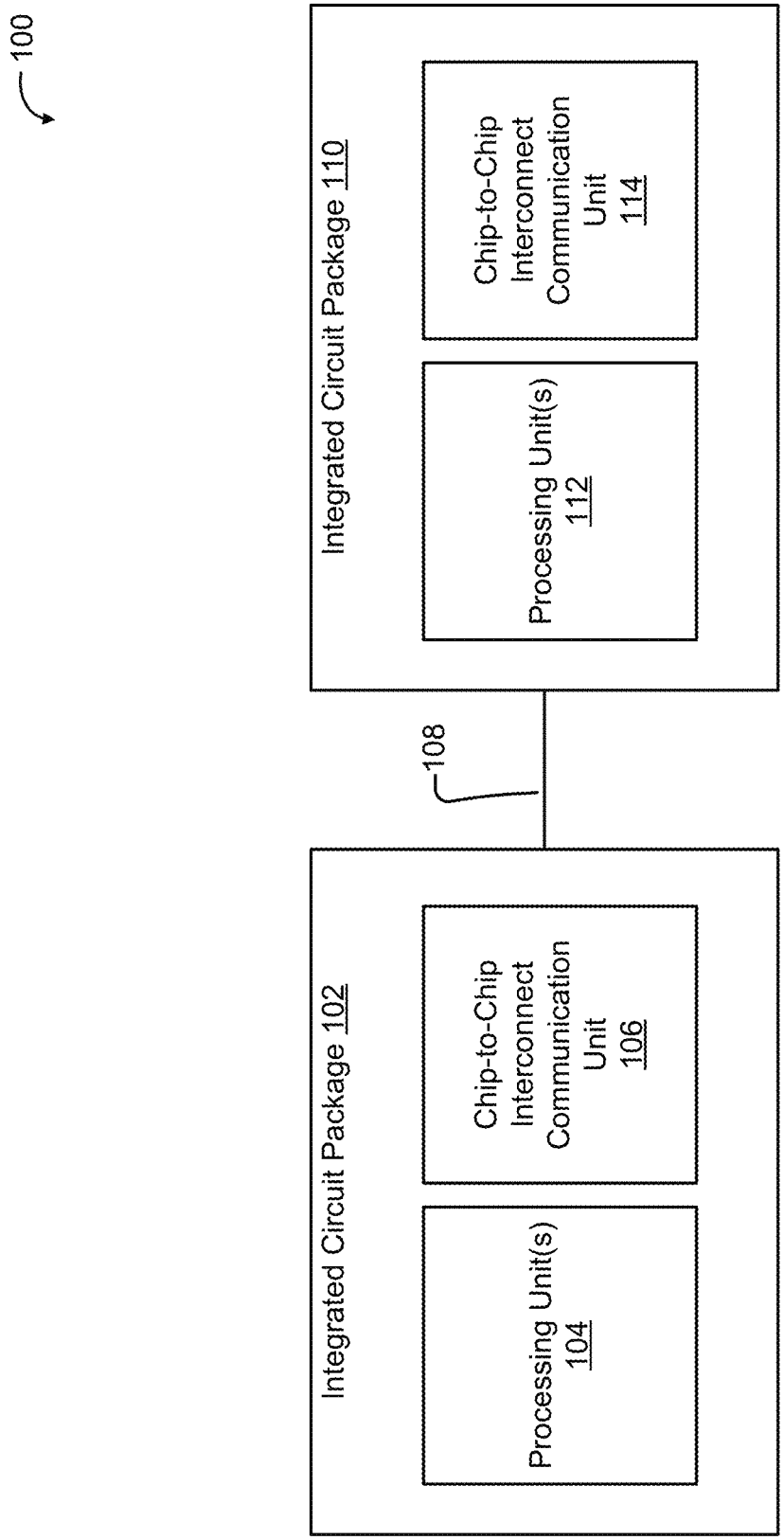
FIG. 1 is a block diagram illustrating an embodiment of a system of interconnected chips.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system includes a first integrated circuit package including a first group of one or more artificial intelligence processing units and a first chip-to-chip interconnect communication unit and a second integrated circuit package including a second group of one or more artificial intelligence processing units and a second chip-to-chip interconnect communication unit. The system also includes an interconnect between the first integrated circuit package and the second integrated circuit package, wherein the first chip-to-chip interconnect communication unit and the second chip-to-chip interconnect communication unit manage ethernet-based communication via the interconnect using a layered communication architecture supporting a credit-based data flow control and a retransmission data flow control.

In various embodiments, a protocol is defined to connect two compute devices. Such a connection can be described as a chip-to-chip interconnect. As used herein, a chip includes semiconductor material cut from a larger wafer of material on which transistors can be etched. Chips may also be referred to as computer chips, microchips, integrated circuits (ICs), silicon chips, etc. Advantages of the techniques disclosed herein include scalability and more efficient communication protocols. A problem to solve is how to achieve fast and flexible chip-to-chip communication. The problem arises because oftentimes chip-to-chip communication relies on chip-specific communication protocols that are neither flexible nor scalable. As described in further detail herein, a solution includes leveraging an existing physical layer protocol (e.g., Ethernet) that is widely used and/or implemented in existing devices for use for chip-to-chip communication. In order to leverage the existing physical layer protocol, in various embodiments, a layered communication architecture is deployed. In various embodiments, the layered communication architecture supports credit-based flow control and packet retransmission techniques.

The techniques disclosed herein address problems associated with the growth of artificial intelligence (AI) clusters. In AI clusters, many types of interfaces typically exist. For example, an Internet protocol may be used, which may determine network speed, but another interface may be used for chip-to-chip communication, which would determine chip-to-chip speed. Different proprietary chip-to-chip protocols may be used at the same time. Using the techniques disclosed herein, a standard physical protocol can be adopted for chip-to-chip communication to allow for improved scalability and additional application and reliability protocol layers can be incorporated to support the standard physical protocol. Using these layers, it is possible to scale to any speed because the standard physical protocol is implemented by all devices, meaning device-to-device communication is possible without specialized switching hardware. As described in further detail herein, technological advantages of such an approach include: 1) a layered architecture that carves out responsibilities for each layer, offering a flexible application layer interface that can be tuned for any application, an interconnect that can be split into multiple parallel slices to meet a required interface bandwidth (packets can be sprayed among multiple slices using efficient load balancing and congestion control), and a scalable architecture with possible extensions to one-hop networks through a standard switch; 2) full duplex high-speed and low-latency links scalable to network speed growth; 3) point-to-point resilient and lossless connection; 4) support for credit-based flow control to manage traffic congestion and receive overflow; 5) and low overhead and area footprint.

FIG. 1 is a block diagram illustrating an embodiment of a system of interconnected chips. In the example illustrated, system 100 includes integrated circuit package 102, interconnect 108, and integrated circuit package 110. Integrated circuit package 102 includes processing unit(s) 104 and chip-to-chip interconnect communication unit 106. Integrated circuit package 110 includes processing unit(s) 112 and chip-to-chip interconnect communication unit 114.

In the example shown, integrated circuit packages 102 and 110 are separate devices. In some embodiments, integrated circuit packages 102 and 110 are separate AI accelerators. An AI accelerator refers to a high-performance computation device that is specifically designed for the efficient processing of AI workloads, e.g., neural network training. Processing unit(s) 104 and processing unit(s) 112 of integrated circuit package 102 and integrated circuit package 110, respectively, can be comprised of various types of one or more processors. Examples of processors include application-specific integrated circuits (ASICs), graphics processing units (GPUs), central processing units (CPUs), field-programmable gate arrays (FPGAs), multicore scalar processors, spatial accelerators, or other types of components configured to perform logical and arithmetical operations on data as specified in instructions. In various embodiments, processing unit(s) 104 and processing unit(s) 112 handle AI workloads. Stated alternatively, in various embodiments, processing unit(s) 104 and processing unit(s) 112 are artificial intelligence processing units.

In the example illustrated, integrated circuit package 102 and integrated circuit package 110 are connected directly via interconnect 108. Thus, in the example shown, interconnect 108 is a chip-to-chip interconnect. Stated alternatively, interconnect 108 includes a physical path between integrated circuit package 102 and integrated circuit package 110 for data exchange. With respect to the physical path, in some embodiments, interconnect 108 comprises conventional electric wire interconnection. It is also possible for other signal transmission modes to be employed, e.g., interconnection through optical or wireless interconnection techniques. In various embodiments, as described in further detail herein, a layered architecture is utilized to interface integrated circuit package 102 and integrated circuit package 110. An interface for integrated circuit package 102 and/or integrated circuit package 110 refers to a logical stateful connection between integrated circuit packages 102 and 110 following a common protocol. In the example shown, integrated circuit packages 102 and 110 are connected in a direct connection topology. It is also possible for integrated circuit packages 102 and 110 to be connected through a switch topology. For example, integrated circuit packages 102 and 110 may be linked via a single hop connection in which integrated circuit package 102 communicates with integrated circuit package 110 through another device (e.g., a hardware switch). In such scenarios, the communication interfaces described herein would also be implemented on the intermediary device (e.g., the hardware switch). The example illustrated shows a point-to-point connection between two devices. This example is illustrative and not restrictive. Using the techniques disclosed herein, any number of devices may be connected in any of various manners (e.g., point-to-multi-point via star, mesh, bus, or other topologies).

In the example shown, chip-to-chip interconnect communication units 106 and 114 implement communication interfaces for integrated circuit packages 102 and 110, respectively. Stated alternatively, a chip-to-chip interconnect communication unit of a device handles communication of data (e.g., created by a processing unit) to another device through interconnect 108. In the example illustrated, each chip-to-chip interconnect communication unit is shown as separate from associated processing unit(s). It is also possible for the chip-to-chip interconnect communication unit to be integrated with one or more processing units (e.g., reside on a same integrated circuit). In some embodiments, the chip-to-chip interconnect communication unit is included on a hardware component that is specifically designed to connect different computers (e.g., a network interface controller). As described in further detail below, in some embodiments, the chip-to-chip interconnect communication unit includes ethernet communication logic, additional protocol logic, and a hardware buffer.

Figure 2:
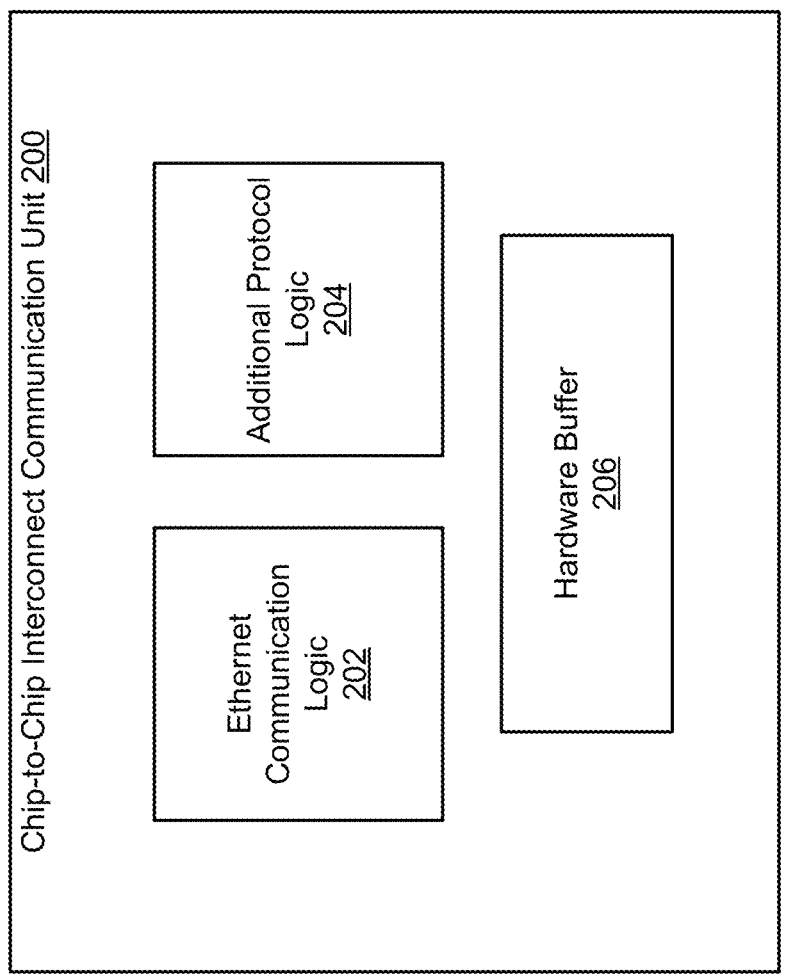
FIG. 2 is a block diagram illustrating an embodiment of a chip-to-chip interconnect communication unit.

FIG. 2 is a block diagram illustrating an embodiment of a chip-to-chip interconnect communication unit. In some embodiments, chip-to-chip interconnect communication unit 200 is chip-to-chip interconnect communication unit 106 of FIG. 1 and/or chip-to-chip interconnect communication unit 114 of FIG. 1.

In the example illustrated, chip-to-chip interconnect communication unit 200 includes Ethernet communication logic 202, additional protocol logic 204 (computational logic), and hardware buffer 206. In some embodiments, a network interface controller (NIC) (also known as a network interface card, network adapter, or local area network adapter) is included in chip-to-chip interconnect communication unit 200 and includes Ethernet communication logic 202. Ethernet communication logic 202 includes electronic circuitry configured to communicate using a specific physical layer (e.g., interconnect 108 of FIG. 1 and/or physical network layer 308 of FIG. 3). Ethernet communication logic 202 may be included in a dedicated Ethernet integrated circuit.

In various embodiments, additional protocol logic 204 includes electronic circuitry configured to communicate using various communication protocols of a layered communication architecture. Additional protocol logic 204 supports protocols beyond the physical layer communication that Ethernet communication logic 202 supports. In some embodiments, additional protocol logic 204 is included in a dedicated integrated circuit, e.g., on an ASIC. It is also possible for additional protocol logic 204 to be integrated on a same chip as Ethernet communication logic 202. In some embodiments, additional protocol logic 204 includes electronic circuitry configured to perform the processing of application layer 302 of FIG. 3, message dispatch and reassembly layer 304 of FIG. 3, and reliability layer 306 of FIG. 3.

Figure 3:
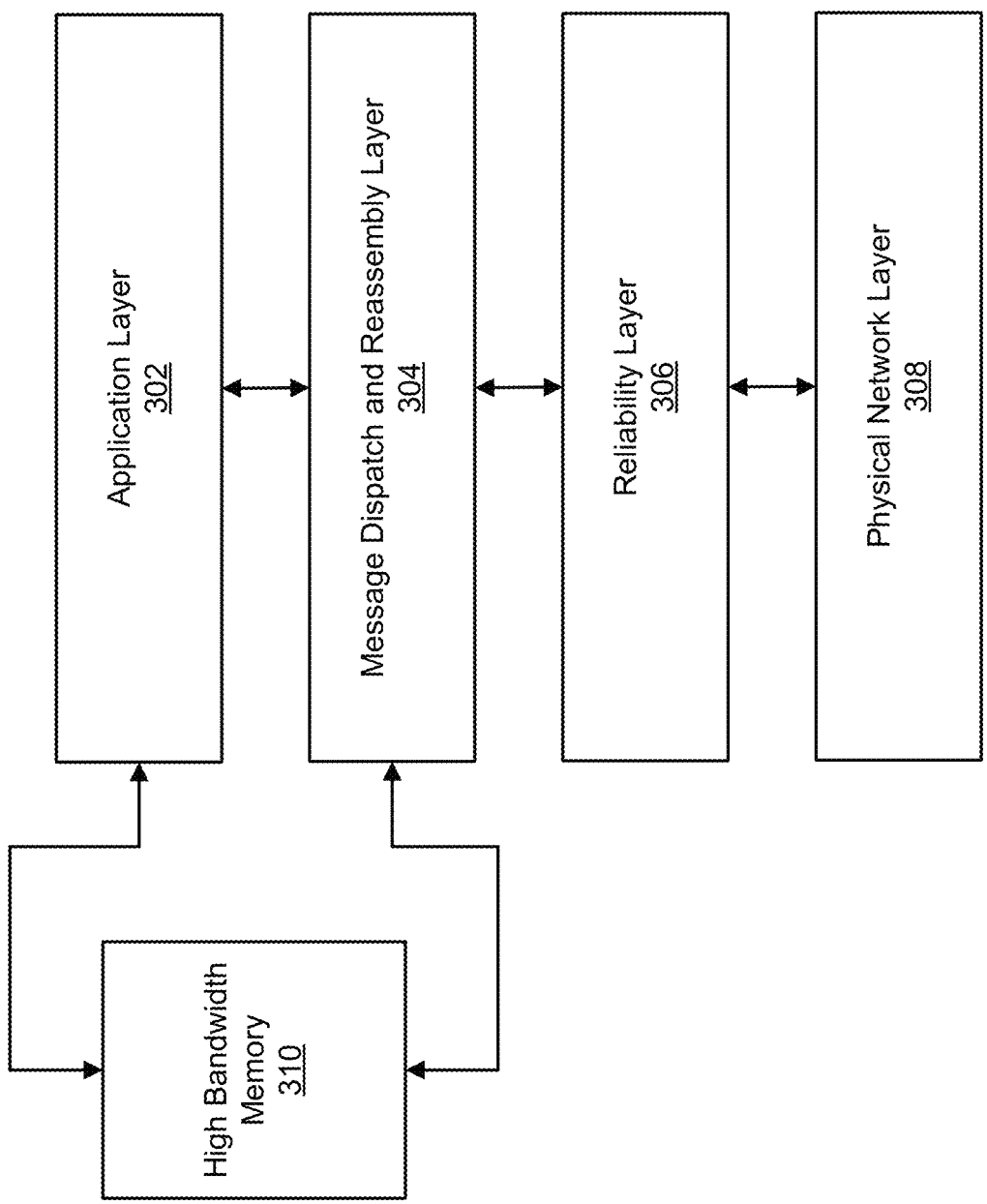
FIG. 3 is a block diagram illustrating an embodiment of a layered communication architecture.

Hardware buffer 206 is configured to store data processing during various phases of receive and transmit across various layers of a layered communication architecture (e.g., architecture 300 of FIG. 3). Hardware buffer 206 may be comprised of different buffers allocated for different types of data (e.g., a receive buffer for data packets received from a device, a transmit buffer for data packets to be transmitted to the device, etc.). In some embodiments, hardware buffer 206 is comprised of memory implemented using digital logic gates. In the example shown, hardware buffer 206 is shown as separate from Ethernet communication logic 202 and additional protocol logic 204. It is also possible, for hardware buffer 206 to be included within Ethernet communication logic 202 or additional protocol logic 204.

FIG. 3 is a block diagram illustrating an embodiment of a layered communication architecture. In some embodiments, at least a portion of architecture 300 is supported by chip-to-chip interconnect communication unit 106 of FIG. 1, chip-to-chip interconnect communication unit 114 of FIG. 1, and/or chip-to-chip interconnect communication unit 200 of FIG. 2.

In the example illustrated, architecture 300 is comprised of application layer 302, message dispatch and reassembly layer 304, reliability layer 306, and physical network layer 308. In the example illustrated, application layer 302 and message dispatch and reassembly layer 304 communicate with high bandwidth memory 310. Layering of communication protocols as shown for architecture 300 has the advantage of allowing for flexibility and lighter protocols. It is possible to independently change or add additional features to each layer.

In various embodiments, application layer 302 interfaces with a communication library and manages work requests from a software application. In various embodiments, from a workload standpoint, abstraction is provided to applications through a send buffer and receive buffer interface. The send buffer and receive buffer hold data between two communication partners and manage data reliability and credit flow. The send buffer is also used for holding unacknowledged packets and hence manages any data loss recovery. The receive buffer can be a data holding buffer for pipeline purposes. In some embodiments, the work requests from applications can be managed by work request managers and interface with direct memory access (DMA) engines. A DMA engine can move data between high-bandwidth memory (HBM) and send/receive buffers. Managing work requests, including managing transmit and receive data flow, is described in further detail herein (e.g., see FIGS. 8 and 9). Application layer 302 also manages connections between peers. In some embodiments, the logic for application layer 302 resides in additional protocol logic 204 of FIG. 2.

With respect to transmitting data, in various embodiments, message dispatch and reassembly layer 304 is responsible for segmentation and reassembly of the message packets based on work requests presented from application layer 302. As part of the message segmentation, message dispatch and reassembly layer 304 determines a load balancing scheme across various reliability layers and dispatches the packets accordingly. In some embodiments, switching within a device (e.g., integrated circuit packages 102 or 110 of FIG. 1) from one port to another is utilized for load balancing. Switching logic (electronic circuitry) may be used to distribute packets to multiple data paths. In various embodiments, message dispatch and reassembly layer 304 maintains a unique monotonically incrementing message sequence number (MSN) and appends it as part of packet headers. After all messages have been reliably delivered to a receiver, message dispatch and reassembly layer 304 creates appropriate message completion entries for application layer 302. With respect to receiving data, message dispatch and reassembly layer 304 maintains an address lookup for incoming packets. In various embodiments, because packets can be received in an out-of-order manner, the reassembly of packets occurs in high bandwidth memory 310 directly and no additional states are needed. In various embodiments, the address lookup and reassembly are based on the MSN that is carried per packet header. In some embodiments, the logic for message dispatch and reassembly layer 304 resides in additional protocol logic 204 of FIG. 2.

In various embodiments, reliability layer 306 is maintained per network path, and the network path can be configured as a logical/physical port of an endpoint device. In various embodiments, packets that go through reliability layer 306 are transmitted and received in order and reliability layer 306 maintains a monotonically incrementing sequence that indicates the order of transmission and thereby packet receipt order. In various embodiments, reliability layer 306 maintains end-to-end credits, acknowledgements for packet data, and retransmissions when packet drops occur. Credit-based data flow is described in further detail herein (e.g., see FIG. 5). Packet acknowledgement and retransmission are also described in further detail herein (e.g., see FIGS. 6 and 7). In some embodiments, the logic for reliability layer 306 resides in additional protocol logic 204 of FIG. 2.

In various embodiments, physical network layer 308 is the interface into a connection with another device. In some embodiments, the logic for physical network layer 308 resides in Ethernet communication logic 202 of FIG. 2. In some embodiments, physical network layer 308 comprises media access control (MAC) and physical coding sublayer (PCS) protocols. In some embodiments, physical network layer 308 includes a serializer/de-serializer (Serdes) functional block that serializes and deserializes digital data. In various embodiments, the Serdes functional block (e.g., implemented in digital logic within Ethernet communication logic 202 of FIG. 2) includes parallel-to-serial and serial-to-parallel data conversion functionality.

Figure 4:
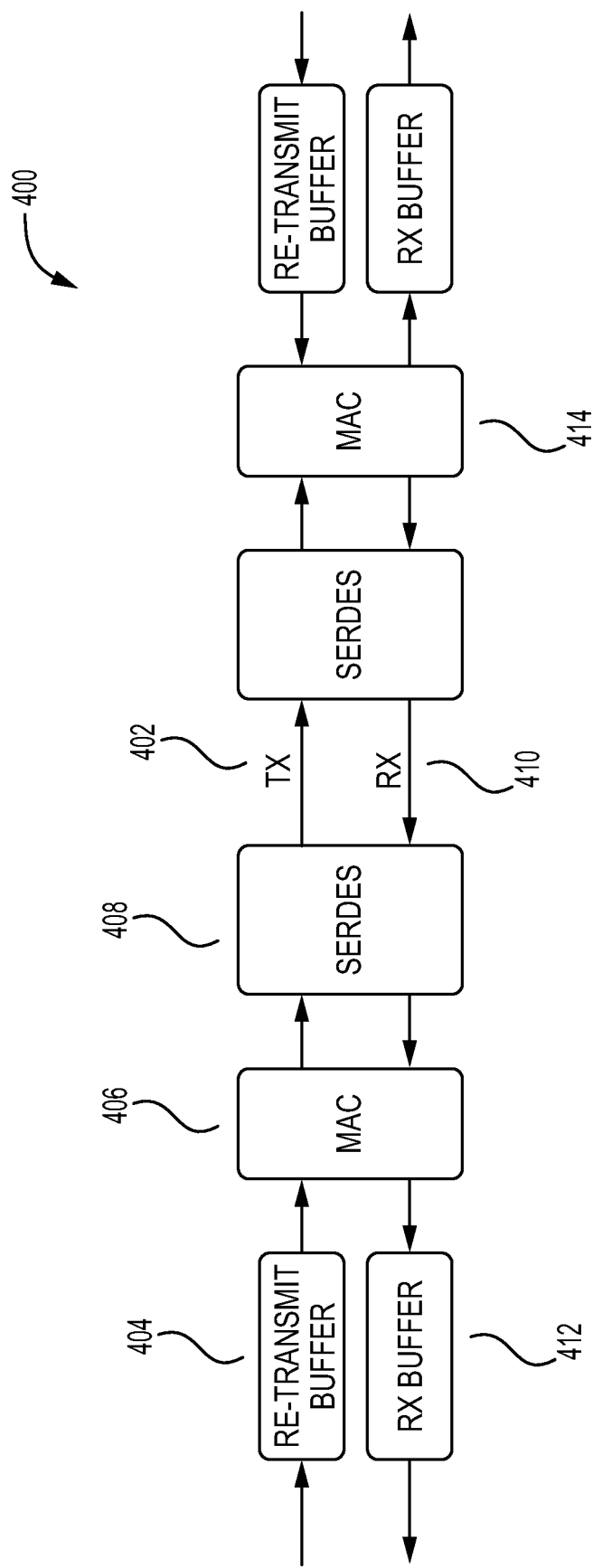
FIG. 4 is a diagram illustrating a framework for chip-to-chip data flow.

FIG. 4 is a diagram illustrating a framework for chip-to-chip data flow. Framework 400 is from the perspective of a device transmitting and receiving data (e.g., integrated circuit package 102 of FIG. 1 or integrated circuit package 110 of FIG. 1).

In framework 400, with respect to transmit (TX) direction 402, data from re-transmit buffer 404 (or another data storage location) goes through MAC 406 and Serdes 408 functional blocks. With respect to receive (RX) direction 410, data is received via Serdes 408 and MAC 406 functional blocks and placed in RX buffer 412. In some embodiments, MAC 406 and Serdes 408 are included in physical network layer 308 of FIG. 3. In some embodiments, re-transmit buffer 404 and RX buffer 412 are included in hardware buffer 206 of FIG. 2.

In various embodiments, various features are deployed and implemented for reliable and lossless traffic between link partners, e.g., to prevent data corruption and packet loss. In some embodiments, MAC 406 utilizes a cyclic redundancy check (CRC) or other error-detecting code. The MAC of a communication partner (MAC 414) can check the CRC and flag an error if the CRC does not match, and receiver transport logic can drop packets received with bad CRCs.

In various embodiments, a credit-based flow control mechanism is used to maintain overflow at a receiver. For example, RX buffer 412 can store data received and exchange the available space in the receive buffer with a transmitter periodically. The transmitter can check the available credit at the receiver before sending packets. In this manner, two communication partners are aware of buffer availability of each other and can maintain traffic flow. Throttling of the transmitter can be performed if there is not enough credit left in the receive buffer. Credit-based flow control is described in further detail herein (e.g., see FIG. 5).

In various embodiments, for reliable and lossless transmission, a mechanism for reporting loss and errors to the transmitter and perform re-transmission of dropped/lost packets by the transmitter is utilized. In various embodiments, a Packet Sequence Number (PSN), re-transmit buffer (e.g., re-transmit buffer 404) and an acknowledgement (ACK)/no acknowledgement (NAK) flow control framework is utilized to manage the retransmission of lost/dropped packets. In the example shown, re-transmit buffer 404 stores packets being transmitted to a communication partner. The packets can be retired after receiving an ACK and re-transmitted after receiving a NAK. Transmitters can attach a sequence number to each packet and keep track of the sequence number of packets received without any error. Receivers can periodically update the sequence number of the last good packet received. Retransmission using ACK and NAK signals is described in further detail herein (e.g., see FIGS. 6 and 7).

Figure 5:
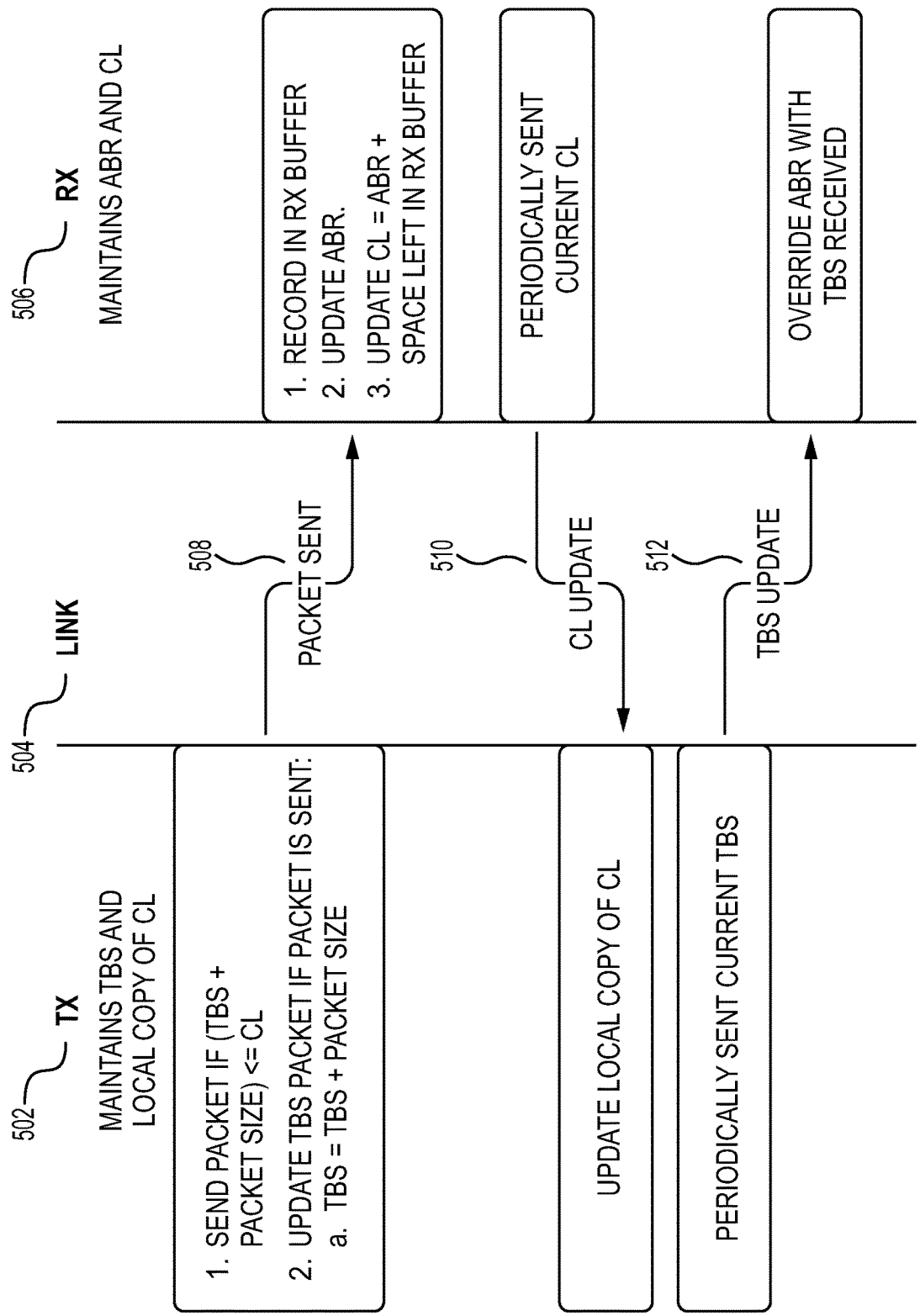
FIG. 5 is a diagram illustrating an example of credit-based data flow control.

FIG. 5 is a diagram illustrating an example of credit-based data flow control. In some embodiments, logic for the credit management shown in FIG. 5 is included in reliability layer 306 of FIG. 3.

In the example illustrated, transmitter 502 sends packets to receiver 506 via link 504. Transmitter 502 (TX 502) and receiver 506 (RX 506) are communication partners. In some embodiments, transmitter 502 and receiver 506 are integrated circuit package 102 of FIG. 1 and integrated circuit package 110 of FIG. 1, respectively, or vice versa. In some embodiments, link 504 is interconnect 108 of FIG. 1.

In various embodiments, credit-based flow control uses credit counts. A credit can be a specified size block of data (e.g., a credit can be a 64-byte block of data). In various embodiments, a maximum number of credits is supported (e.g., 2048 credits). With these example values, a total of 128 kilobytes (kB) of data is supported (2048×64 bytes=128 kB). In various embodiments, TX 502 (the transmitter) and RX 506 (the receiver) maintain an absolute credit count. In various embodiments, TX 502 maintains a Total Blocks Sent (TB S) counter, which tracks total blocks sent via link 504 after initialization, updates for every packet sent via link 504, and sends the TBS value to RX 506 periodically. In addition, in various embodiments, TX 502 receives a Credit Limit (CL) from RX 506 and periodically stores the CL locally. In various embodiments, TX 502 allows packets to be transmitted if TBS+Packet Size is less than or equal to CL. In various embodiments, RX 506 receives data in a receive buffer and maintains an Absolute Blocks Received (ABR) counter, which tracks the total blocks received via link 504, updates for every packet received, and overrides ABR with TBS received from TX 502. In some embodiments, the receive buffer is included in hardware buffer 206 of FIG. 2 and/or RX buffer 412 of FIG. 4. In various embodiments, RX 506 maintains CL, which is calculated by adding ABR and the available buffer space in the receive buffer. As indicated above, CL is periodically sent by RX 506 to TX 502.

In various embodiments, at initialization, TX 502 and RX 506 update the available receive credits according to the size of the receive buffer. In various embodiments, at initialization, TX 502 sets TBS and CL to 0 and waits for a CL update from RX 506. In addition, in various embodiments, RX 506 sets ABR to 0 and updates CL according to the size of the receive buffer. In various embodiments, RX 506 sends the updated CL, which TX 502 receives and uses to override its local copy of CL. When TX 502 receives a request to send a packet over link 504, TX 502 transmits the packet if TBS+Packet Size is less than or equal to CL. Sending of the packet is illustrated in FIG. 5 as action 508. After sending the packet, TBS is updated to TBS=TBS+Packet Size. The sent packet is received by RX 506 and stored in a local receive buffer of RX 506. RX 506 also updates the ABR by the Packet Size (of the packet received) and updates CL=ABR+space left in the receive buffer. Flow control updates are sent periodically. RX 506 periodically sends the latest CL to TX 502, which overrides its local copy of CL with the received CL (action 510). In addition, TX 502 periodically sends the latest TBS to RX 506 and RX 506 overrides its ABR with the received TBS (action 512). Using the credit management framework illustrated in FIG. 5, communication traffic can be managed and throttled (reduced) if needed. In some embodiments, the credit management framework is built on top of Serdes and MAC Ethernet protocols (e.g., built on top of the MAC layer). An advantage of leveraging existing Ethernet protocols is flexibility and universality because most existing devices already implement Ethernet protocols.

Figure 6:
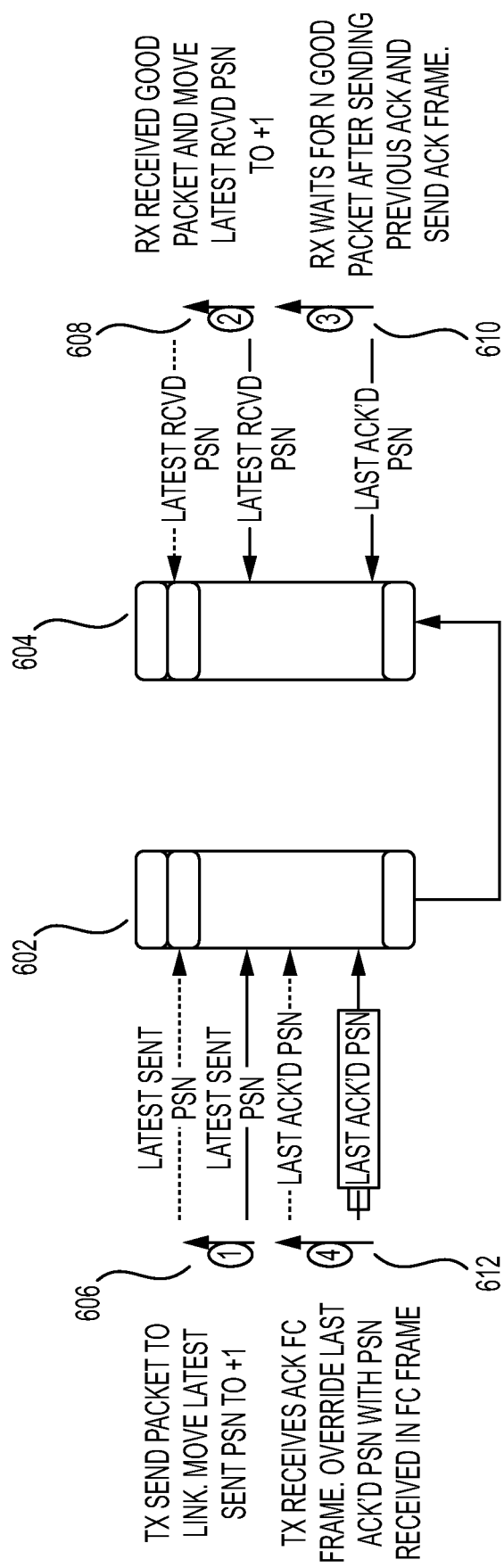
FIG. 6 is a diagram illustrating an example of acknowledgment of data flow.

FIG. 6 is a diagram illustrating an example of acknowledgment of data flow. In some embodiments, logic for the acknowledgment of data flow shown in FIG. 6 is included in reliability layer 306 of FIG. 3. In various embodiments, Packet Sequence Numbers (PSNs) and ACK/NAK flow control are used to communicate the status of packets received by a communication partner.

In the example illustrated, communication is shown between transmit side 602 and receive side 604. In some embodiments, transmit side 602 and receive side 604 correspond to integrated circuit package 102 of FIG. 1 and integrated circuit package 110 of FIG. 1, respectively, or vice versa. In some embodiments, data is sent between transmit side 602 and receive side 604 via interconnect 108 of FIG. 1. In the example shown, at step 606, transmit side 602 sends a packet encapsulating "Latest Sent PSN+1" and increments the "Latest Sent PSN" count. Then, at step 608, receive side 604 receives the packet, and if it is a good packet, causes receive side logic to increment "Latest Received PSN" by 1 and increment the Good Packet count (from the last Acknowledged PSN) by 1 as well. At step 610, the receive side logic determines whether the Good Packet count is equal to N (a value that may be specified), and if so, then sends an ACK. In some embodiments, the ACK is sent as a Fibre Channel (FC) packet. Stated alternatively, an ACK is sent after N good packets are received. At step 612, transmit side 602 receives the ACK and extracts the PSN to override "Last Acknowledged PSN" with the PSN extracted from the ACK.

In the above sequences of steps, transmit side 602 maintains two PSNs: a Last Acknowledged PSN that keeps track of the last ACK (good packet) received and a latest sent PSN. Receive side 604 also maintains two PSNs: a Last Acknowledged PSN of the last ACK (good packet) sent back to transmit side 602 and a Latest Received PSN keeping track of the latest received packet. In various embodiments, transmit side 602 also maintains a timer that re-starts every time a valid ACK is received, and receive side 604 maintains a count of continuous good packets received after the last ACK was sent. The steps illustrated in FIG. 6 accurately keep count of good packets transmitted from transmit side 602 to receive side 604 (situation of acknowledgement of data flow). For situations in which errors occur (non-acknowledgement), a NAK procedure is utilized (e.g., see FIG. 7).

Figure 7:
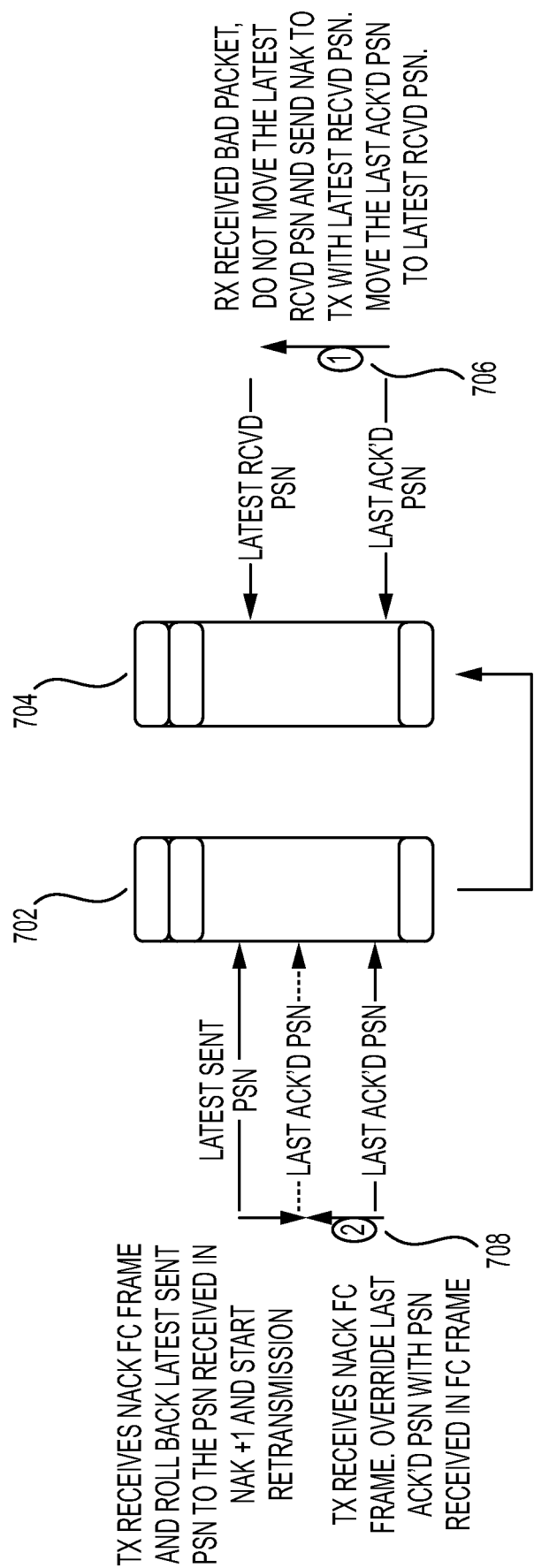
FIG. 7 is a diagram illustrating an example of non-acknowledgment of data flow.

FIG. 7 is a diagram illustrating an example of non-acknowledgment of data flow. In some embodiments, logic for the non-acknowledgment of data flow shown in FIG. 7 is included in reliability layer 306 of FIG. 3. In the example illustrated, communication is shown between transmit side 702 and receive side 704. In some embodiments, transmit side 702 is transmit side 602 of FIG. 6 and receive side 704 is receive side 604 of FIG. 6.

In the example illustrated, at step 706, receive side 704 receives a bad packet (e.g., with a CRC error, PSN count error, packet length error in which packet length is greater than available space in the receive buffer, etc.). Receive side 704 drops the bad packet. Because a bad packet is received, the ACK procedure in FIG. 6 cannot be utilized. Instead, the Latest Received PSN is not incremented and a NAK is sent to transmit side 702. The NAK encapsulates the non-incremented "Latest Received PSN". At this point the "Last Acknowledged PSN" is the "Latest Received PSN". Then, at step 708, transmit side 702 receives the NAK and extracts the PSN. Logic on transmit side 702 then commences retransmission with Latest Sent PSN updated to the PSN extracted from the NAK incremented by one. Transmit side 702 also overrides the Last Acknowledged PSN with the PSN extracted from the NAK. Thus, in a bad packet (non-acknowledgement) situation, receive side 704 indicates to transmit side 702 how to roll back packet sequence numbers to the last good packet count.

Figure 8:
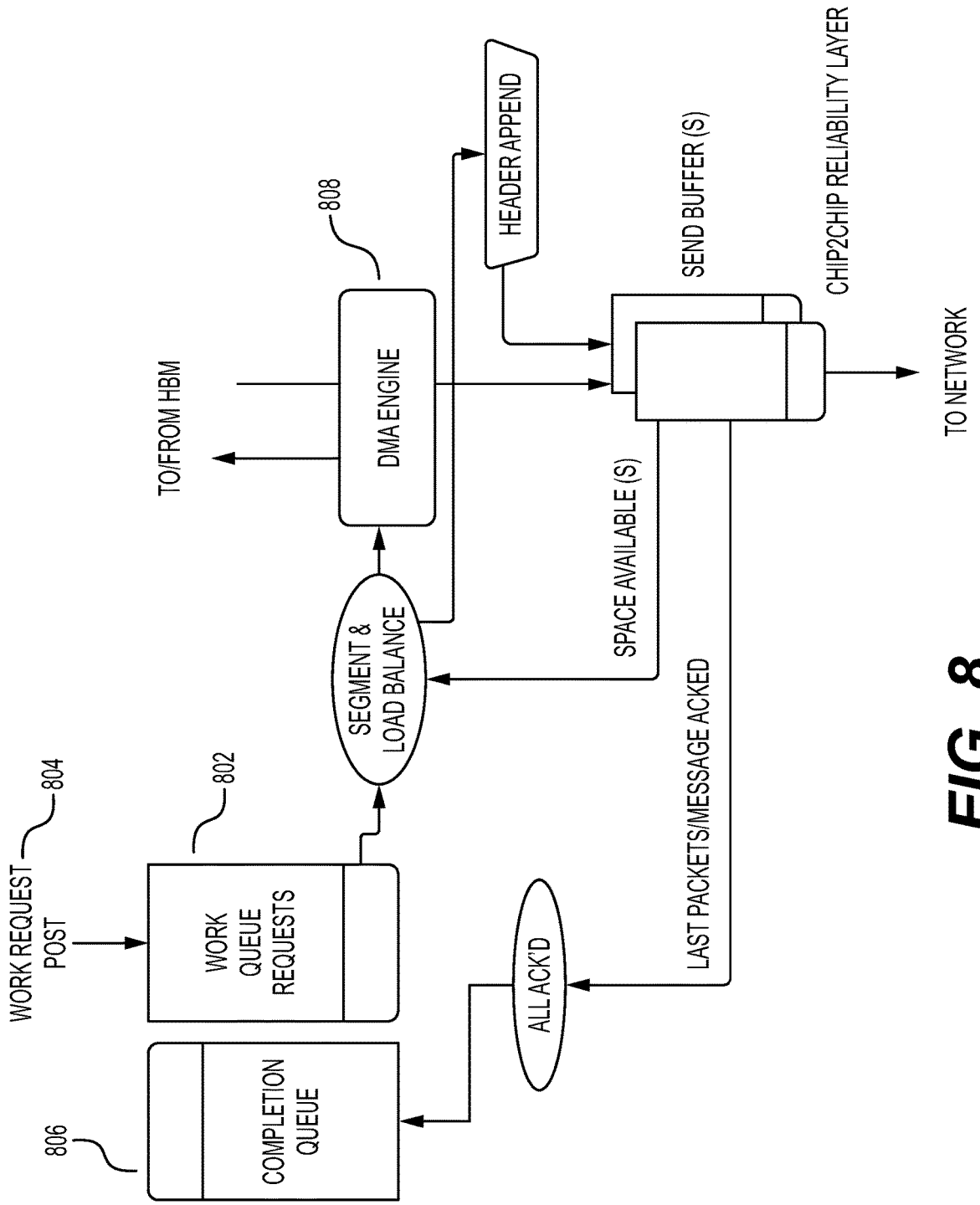
FIG. 8 is a diagram illustrating an example of data flow from a send request standpoint.

FIG. 8 is a diagram illustrating an example of data flow from a send request standpoint. In some embodiments, the data flow shown in FIG. 8 is managed by a work request manager of application layer 302 of FIG. 3. In the example illustrated, the work request manager maintains queue 802 of outstanding requests. In various embodiments, these requests are processed in order due to serialization at the chip-to-chip reliability layer. The size of the queue may be a parameterizable number N. From a send request standpoint, a posted work request (e.g., posted work request 804), may include a data structure comprising message identification, message start sequence number, source address, message length, message opcode destination queue pair number, and metadata fields. In the example shown, completed requests are placed in completion queue 806. Once a request is complete, a completion update can be posted back to the requesting application. In various embodiments, for a given request to be marked complete, the last packet of the message needs to be reliably placed into the receiver's reliability layer's buffer.

In the example shown, DMA engine 808 fetches data from high-bandwidth memory and segments them into maximum transport unit (MTU) size payloads. In some embodiments, the high-bandwidth memory is high bandwidth memory 310 of FIG. 3. As part of the payload segmentation, additional headers may be added to each segment and a message sequence number field in the header can be incremented. This field can be used by the receive work request manager described below (e.g., see FIG. 9). The message segmentation process load balances the packet dispatch across different send buffers. This can be based on a configured policy such as deficit round robin or a simple round robin arbitration. To support the back pressure that can occur, the data can be scheduled for a specific send buffer only if the required space for the request (MTU granularity) can be absorbed. The last segment of the message can have a separate marker, and once that segment is acknowledged from all the available reliability layers, a completion event can be generated.

Figure 9:
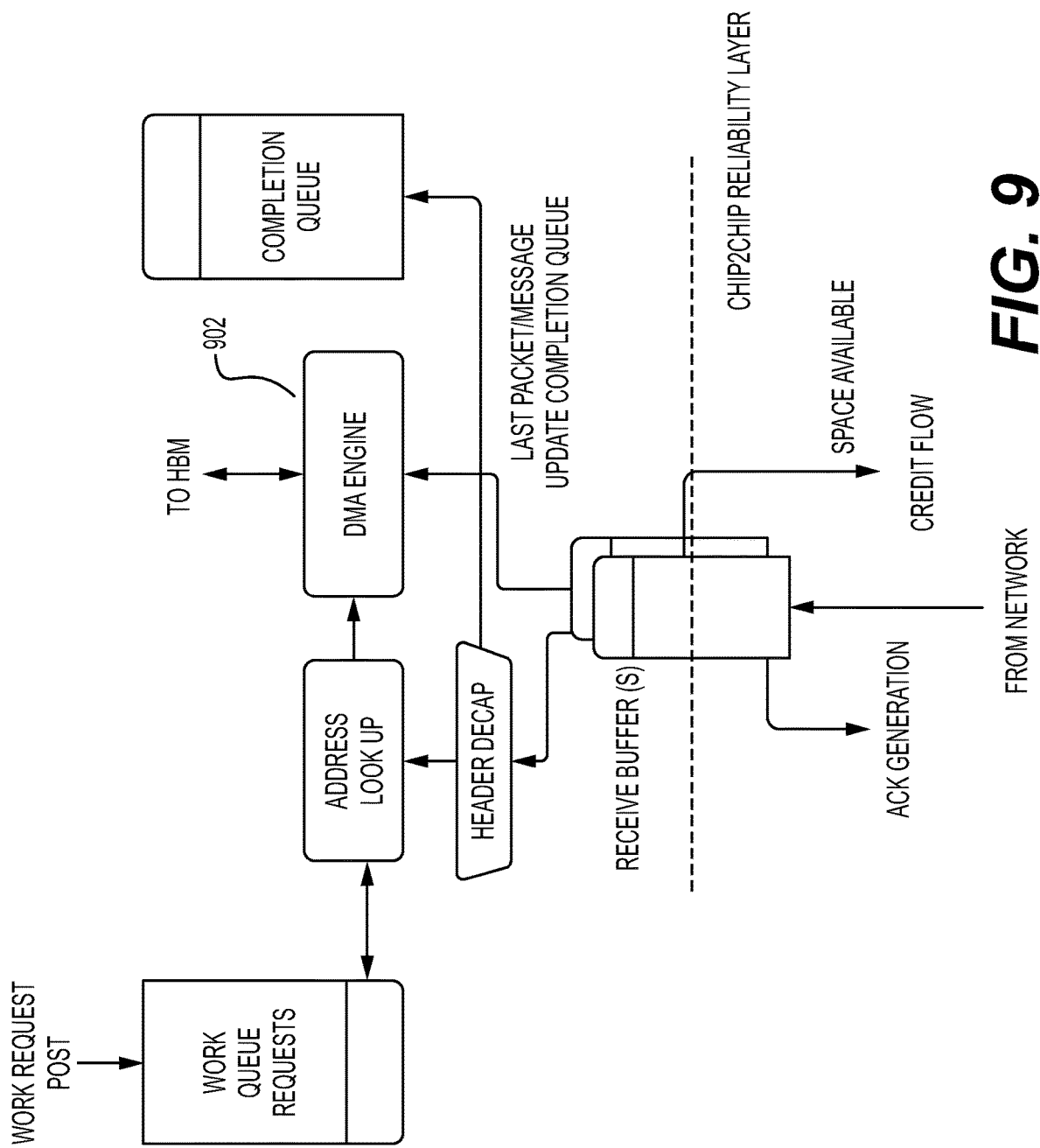
FIG. 9 is a diagram illustrating an example of data flow from a receive request standpoint.

FIG. 9 is a diagram illustrating an example of data flow from a receive request standpoint. In some embodiments, the data flow shown in FIG. 9 is managed by a work request manager of application layer 302 of FIG. 3. In various embodiments, as data is successfully received into a receive buffer (e.g., the data passes CRC and PSN checks), the fields of the packet headers are parsed. In some embodiments, fields of the packet headers that are processed include message identification, message sequence number, destination queue pair number, message opcode, and a flag indicating the last packet of the message. These fields can be used by the work request manager to determine the destination address of the message segments. After the destination address is determined by DMA engine 902, data segments are moved into high-bandwidth memory. In some embodiments, the high-bandwidth memory is high bandwidth memory 310 of FIG. 3. Completions can be generated by a work queue manager after the last packet of the message is successfully received. In some embodiments, from a receive request standpoint, software will post into a work request queue the following information: message identification, message start sequence number, destination base address, expected message length, and metadata to be returned as part of the completion update. Work requests may be maintained in a linear lookup table that is indexed based on the queue pair and the message sequence number as extracted from the headers.

Figure 10:
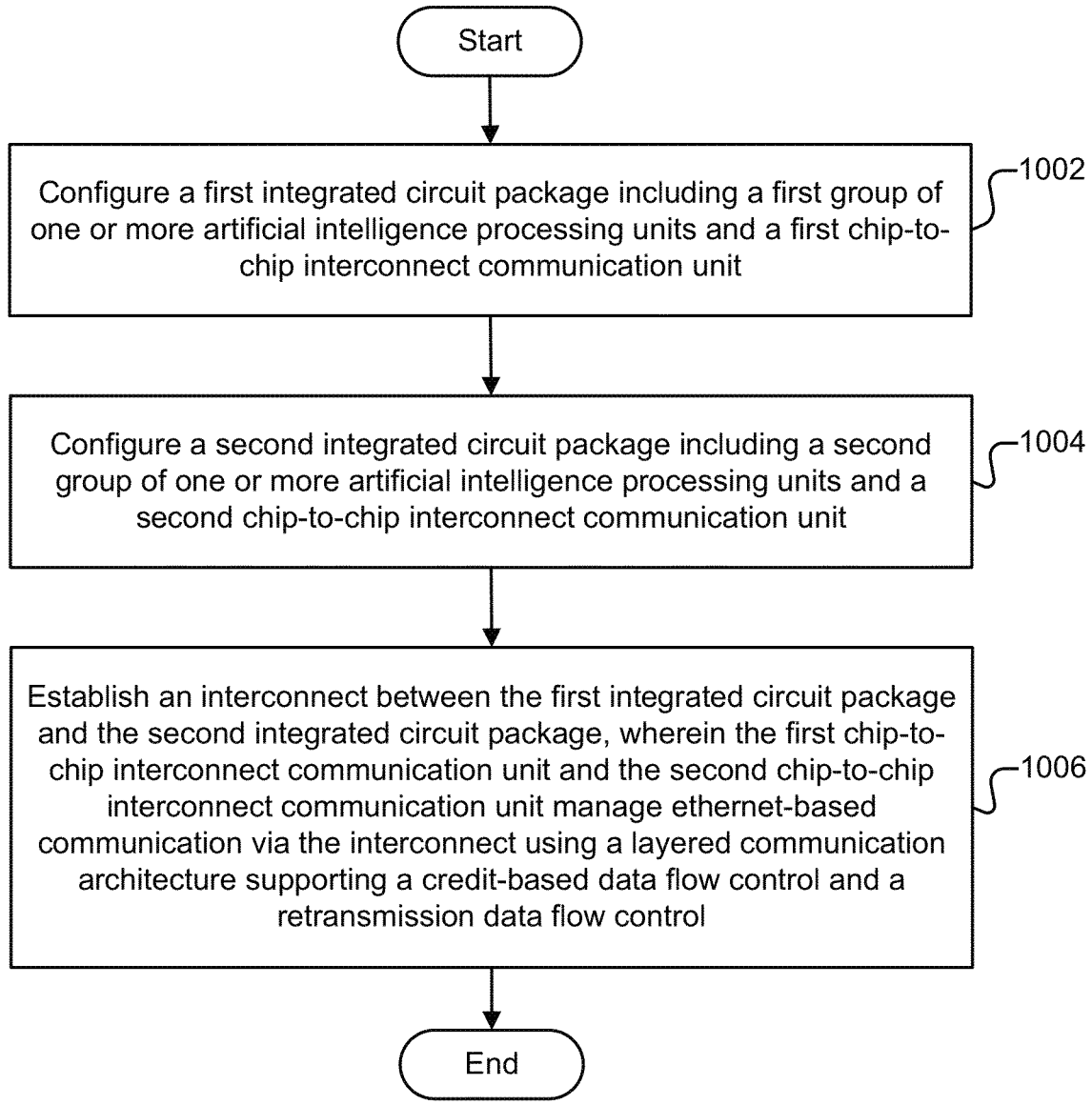
FIG. 10 is a flow diagram illustrating an embodiment of a process for interconnecting chips.

FIG. 10 is a flow diagram illustrating an embodiment of a process for interconnecting chips. In some embodiments, the chips that are interconnected are integrated circuit package 102 of FIG. 1 and integrated circuit package 110 of FIG. 1.

At 1002, a first integrated circuit package including a first group of one or more artificial intelligence processing units and a first chip-to-chip interconnect communication unit is configured. In some embodiments, the first integrated circuit package is integrated circuit package 102 of FIG. 1. In some embodiments, the first group of one or more artificial intelligence processing units is processing unit(s) 104 of FIG. 1. In some embodiments, the first chip-to-chip interconnect communication unit is chip-to-chip interconnect communication unit 106 of FIG. 1. In some embodiments, configuring the first integrated circuit package includes deploying the first group of one or more artificial intelligence processing units and the first chip-to-chip interconnect communication unit in the first integrated circuit package.

At 1004, a second integrated circuit package including a second group of one or more artificial intelligence processing units and a second chip-to-chip interconnect communication unit is configured. In some embodiments, the second integrated circuit package is integrated circuit package 110 of FIG. 1. In some embodiments, the second group of one or more artificial intelligence processing units is processing unit(s) 112 of FIG. 1. In some embodiments, the second chip-to-chip interconnect communication unit is chip-to-chip interconnect communication unit 114 of FIG. 1. In some embodiments, configuring the second integrated circuit package includes deploying the second group of one or more artificial intelligence processing units and the second chip-to-chip interconnect communication unit in the second integrated circuit package.

At 1006, an interconnect between the first integrated circuit package and the second integrated circuit package is established, wherein the first chip-to-chip interconnect communication unit and the second chip-to-chip interconnect communication unit manage ethernet-based communication via the interconnect using a layered communication architecture supporting a credit-based data flow control and a retransmission data flow control. In some embodiments, the interconnect that is established is interconnect 108 of FIG. 1. In some embodiments, establishing the interconnect includes physically connecting the first integrated circuit package with the second integrated circuit package (e.g., via electric wire interconnection).

Figure 11:
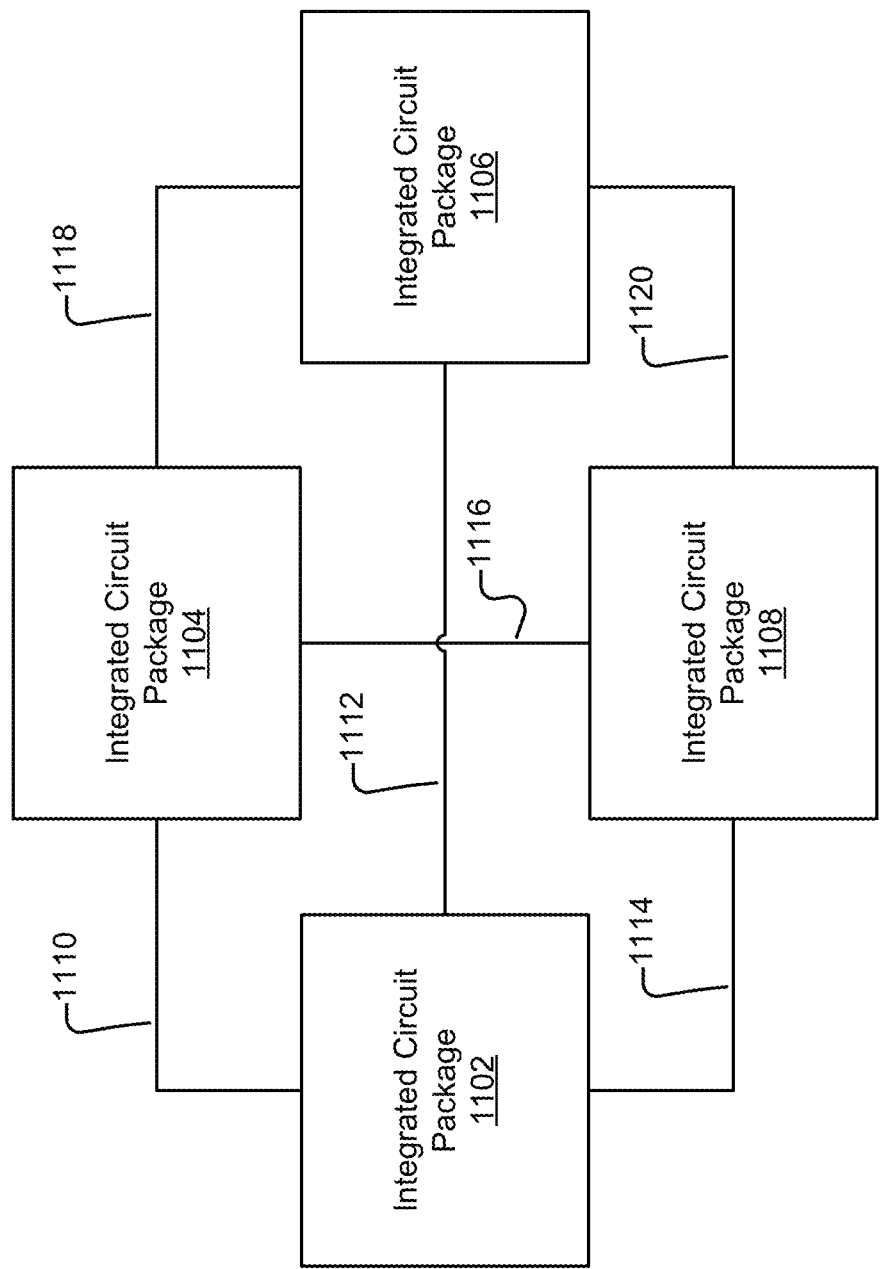
FIG. 11 is a block diagram illustrating an embodiment of a system of chips connected via point-to-point links.

FIG. 11 is a block diagram illustrating an embodiment of a system of chips connected via point-to-point links. In the example illustrated, system 1100 includes integrated circuit packages 1102, 1104, 1106, and 1108. In some embodiments, each of these integrated circuit packages is integrated circuit package 102 and/or 110 of FIG. 1. System 1100 illustrates a topology of point-to-point links between integrated circuit packages (as is shown for system 100 of FIG. 1). However, system 1100 comprises four integrated circuit packages instead of two. This makes the number of links in a point-to-point topology increase significantly. Instead of a single link (interconnect 108 of FIG. 1), six links (interconnects 1110, 1112, 1114, 1116, 1118, and 1120) are required to ensure point-to-point connections between each integrated circuit package. In some embodiments, each interconnect in system 1100 is the same type of interconnect as interconnect 108 of FIG. 1. FIG. 11 shows that a point-to-point topology (similar to that shown in FIG. 1) is still possible with more integrated circuit packages in the system, but the connection scheme is more complicated.

Figure 12A:
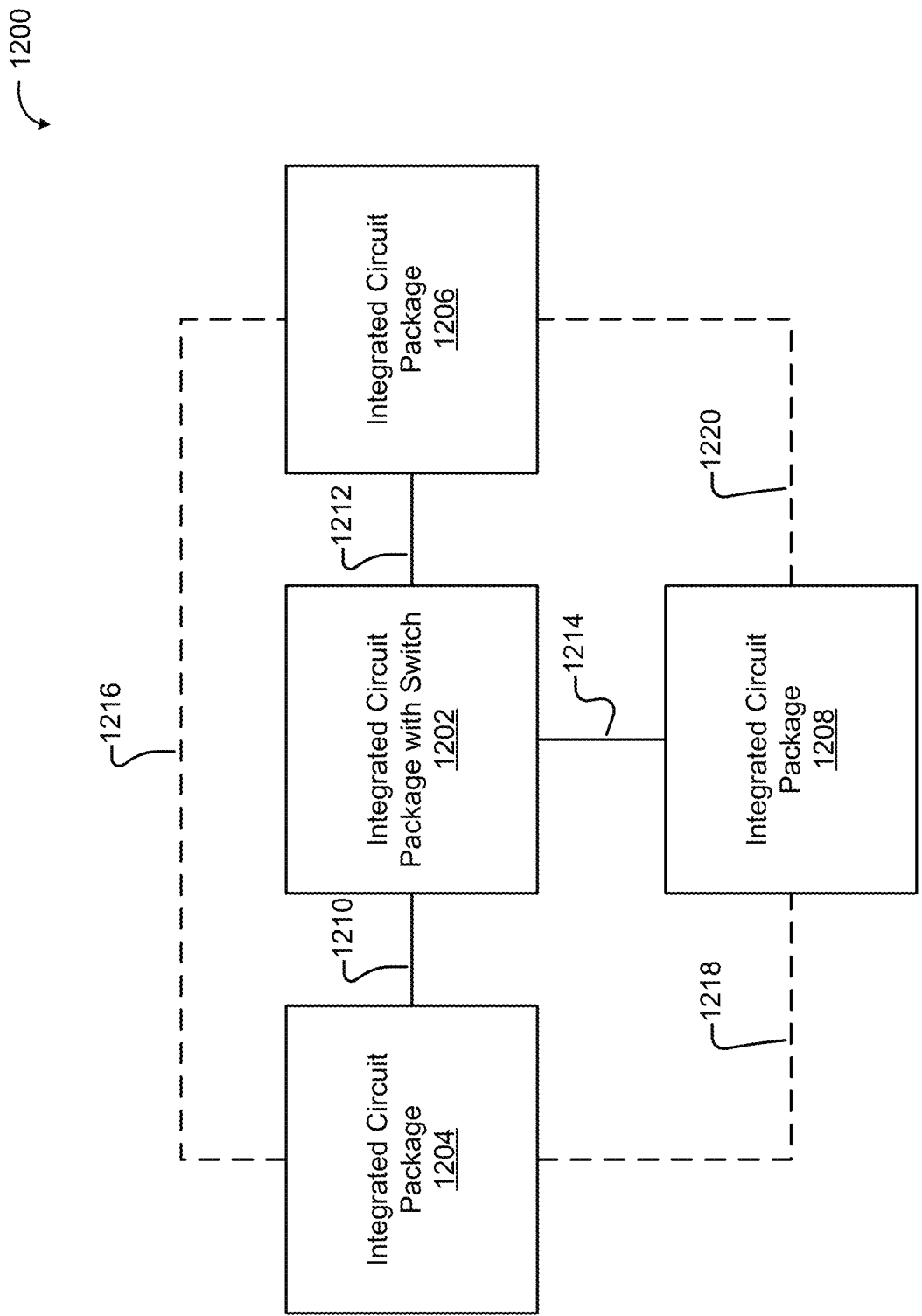
FIGS. 12A and 12B are block diagrams illustrating embodiments of systems of chips connected via units with switches.
Figure 12B:
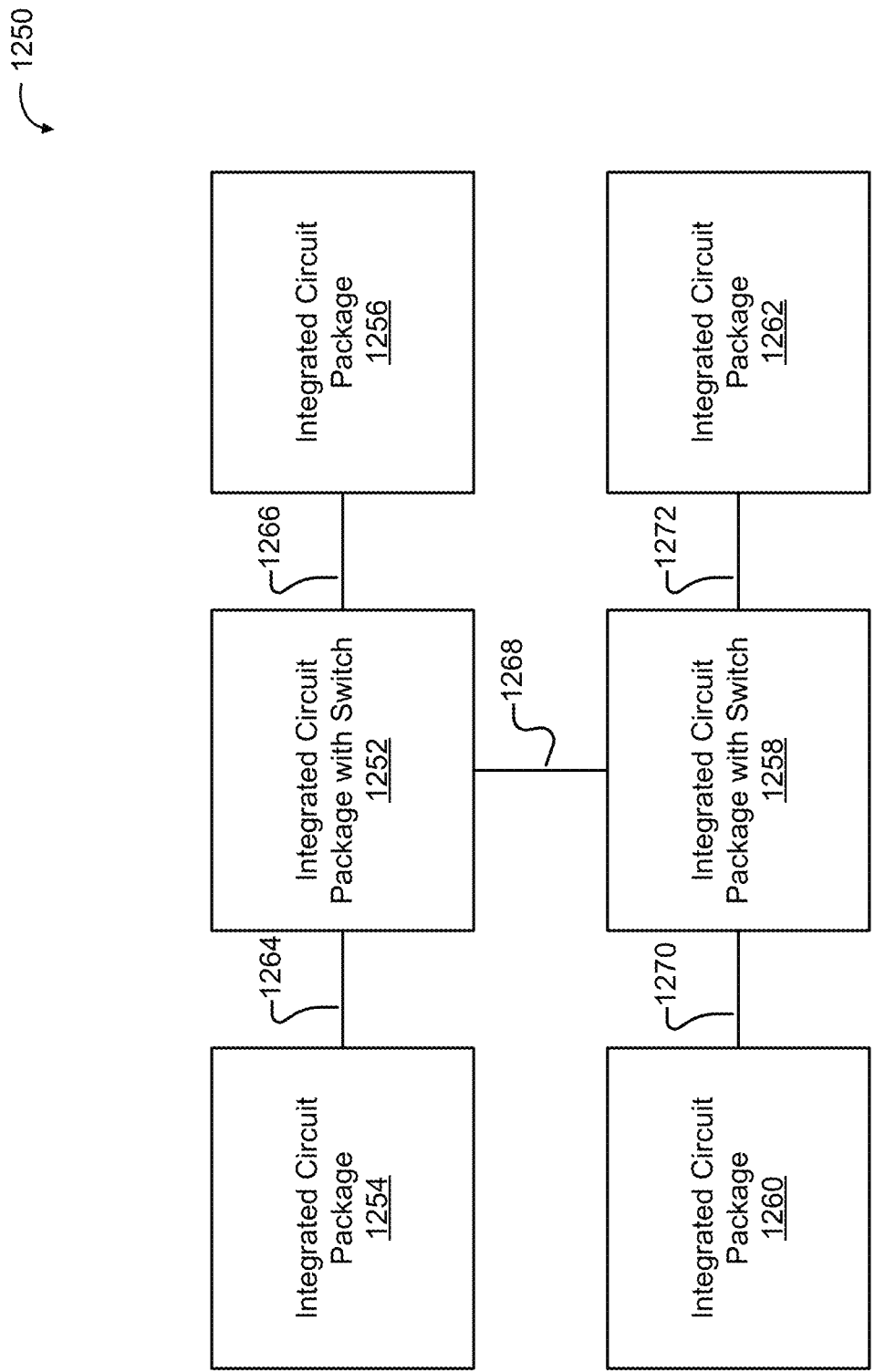

FIGS. 12A and 12B are block diagrams illustrating embodiments of systems of chips connected via units with switches. In FIG. 12A, system 1200 includes integrated circuit package with switch 1202 and integrated circuit packages 1204, 1206, and 1208. In some embodiments, each of integrated circuit packages 1204, 1206, and 1208 is integrated circuit package 102 and/or 110 of FIG. 1 and/or an integrated circuit package of system 1100 of FIG. 11. Integrated circuit package with switch 1202 differs from integrated circuit packages 1204, 1206, and 1208 in that integrated circuit package with switch 1202 includes a hardware switch (see FIG. 13 for an example of an integrated circuit package that includes a hardware switch). Stated alternatively, in various embodiments, integrated circuit package with switch 1202 includes switching and data routing functionality in addition to compute (e.g., AI accelerator) functionality. With switching and data routing functionality, the interconnection scheme of system 1200 can be simplified compared to that of system 1100 of FIG. 11. Both system 1100 of FIG. 11 and system 1200 comprise four integrated circuit packages (e.g., four compute units), but system 1200 requires fewer connections.

In the example shown, integrated circuit packages 1204, 1206, 1208 are connected to integrated circuit package with switch 1202, which acts as a hub, by interconnects 1210, 1212, and 1214, respectively. In some embodiments, each interconnect in system 1200 is the same type of interconnect as interconnect 108 of FIG. 1 and/or an interconnect of system 1100 of FIG. 11. The layered communication architecture shown in FIG. 3 (including the credit-based data flow control shown in FIG. 5 and the acknowledgement and non-acknowledgement of data flow shown in FIGS. 6 and 7, respectively) can also be supported by system 1200. For example, interconnects 1210, 1212, and 1214 maintain point-to-point credits between integrated circuit package with switch 1202 and its directly connected peers. Credits between integrated circuit packages without a switch can also be maintained through an indirect link. For example, integrated circuit packages 1204 and 1206 are connected indirectly through integrated circuit package with switch 1202. This connection is illustrated as conceptual link 1216. Conceptual links 1218 and 1220 are similar representations of indirect connections through integrated circuit package with switch 1202. Credits and other data flow can still be exchanged. Such exchanges via a hub unit (in this case, integrated circuit package with switch 1202) are referred to as end-to-end (e.g., end-to-end credits) instead of point-to-point. To support end-to-end communication, in various embodiments, switching hardware of integrated circuit package with switch 1202 maintains an address space of the various components of system 1200 in order to route communication between the components.

Thus, with a switched topology, it is possible to connect compute units (e.g., AI accelerators) to each other with fewer physical connections (in this case, three physical connections to connect four components in system 1200 instead of six physical connections in system 1100 of FIG. 11 to connect the same number of components). System 1250 of FIG. 12B illustrates a more complex switched topology (with more components). In the example shown in FIG. 12B, end-to-end conceptual links are not drawn in order to illustrate the example clearly. Only direct physical links are drawn. System 1250 comprises six compute components instead of the four shown in system 1200 of FIG. 12A. These are integrated circuit package with switch 1252 and 1258 and integrated circuit packages 1254, 1256, 1260, and 1262. In some embodiments, each of integrated circuit packages 1254, 1256, 1260, and 1262 is integrated circuit package 102 and/or 110 of FIG. 1 and/or an integrated circuit package of system 1100 of FIG. 11 or system 1200 of FIG. 12A. In some embodiments, integrated circuit package with switch 1252 and/or 1258 is integrated circuit package with switch 1202 of FIG. 12A. Five direct physical links (interconnects 1264, 1266, 1268, 1270, and 1272) are shown in system 1250. In some embodiments, each interconnect in system 1250 is the same type of interconnect as interconnect 108 of FIG. 1 and/or an interconnect of system 1100 of FIG. 11 or system 1200 of FIG. 12A. System 1250 differs from system 1200 of FIG. 12A in that some end-to-end connections require routing through two hub units. For example, an end-to-end connection between integrated circuit packages 1254 and 1262 requires routing through integrated circuit package with switch 1252 as well as integrated circuit package with switch 1258. Including more components with switches can reduce the number of direct links required. Various other topologies with any number of components with or without switches are also possible. The examples illustrated are illustrative and not restrictive.

Figure 13:
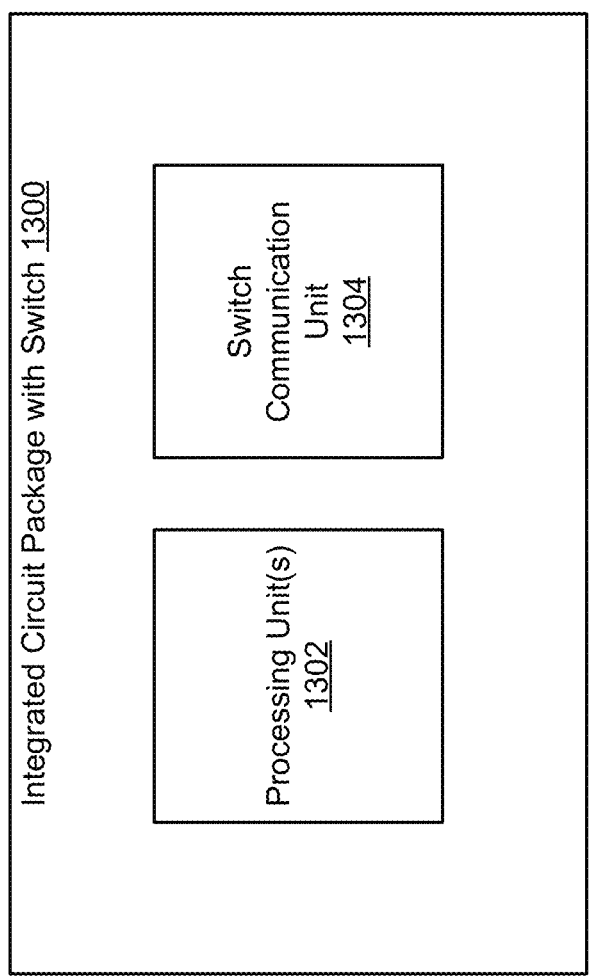
FIG. 13 is a block diagram illustrating an embodiment of an integrated circuit package that includes a hardware switch.

FIG. 13 is a block diagram illustrating an embodiment of an integrated circuit package that includes a hardware switch. In some embodiments, integrated circuit package with switch 1300 is integrated circuit package with switch 1202 of FIG. 12A and/or integrated circuit package with switch 1252 and/or 1258 of FIG. 12B. In the example shown, integrated circuit package with switch 1300 includes processing unit(s) 1302 and switch communication unit 1304. In some embodiments, processing unit(s) 1302 are processing unit(s) 104 or processing unit(s) 112 of FIG. 1. In various embodiments, switch communication unit 1304 is configured to connect multiple devices in a network. In some embodiments, switch communication unit 1304 includes an Ethernet switch (also referred to as a network switch). In some embodiments, the Ethernet switch maintains an address table of unique identifiers corresponding to different devices in a network. The unique identifiers may be hardware addresses (e.g., MAC addresses). In various embodiments, switch communication unit 1304 also includes additional protocol logic comprised of electronic circuitry configured to communicate using various communication protocols of a layered communication architecture. In some embodiments, the additional protocol logic of switch communication unit 1304 includes additional protocol logic 204 of FIG. 2. In various embodiments, switch communication unit 1304 also includes hardware buffer space configured to store data processed during various phases of receive and transmit across various layers of the layered communication architecture. In some embodiments, the hardware buffer space includes hardware buffer 206 of FIG. 2.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first integrated circuit package including a first group of one or more artificial intelligence processing units and a first chip-to-chip interconnect communication unit;
a second integrated circuit package including a second group of one or more artificial intelligence processing units and a second chip-to-chip interconnect communication unit; and
an interconnect between the first integrated circuit package and the second integrated circuit package, wherein the first chip-to-chip interconnect communication unit and the second chip-to-chip interconnect communication unit manage ethernet-based communication via the interconnect using a layered communication architecture supporting a credit-based data flow control that updates a total blocks sent counter based on a block size of a sent packet, wherein the interconnect between the first integrated circuit package and the second integrated circuit package includes a direct chip-to-chip connection configured to carry the ethernet-based communication as a direct chip-to-chip communication between the first integrated circuit package as a first chip and the second integrated circuit package as a second chip.

2. The system of claim 1, wherein the first group of one or more artificial intelligence processing units and the second group of one or more artificial intelligence processing units are configured to handle an artificial intelligence workload that includes training one or more neural networks.

3. The system of claim 1, wherein the first chip-to-chip interconnect communication unit and the second chip-to-chip interconnect communication unit include electronic circuitry logic configured to support a physical layer network communication protocol.

4. The system of claim 3, wherein the physical layer network communication protocol includes an Ethernet communication protocol.

5. The system of claim 1, wherein the first chip-to-chip interconnect communication unit and the second chip-to-chip interconnect communication unit include electronic circuitry logic configured to support a plurality of communication protocols beyond a physical layer network communication protocol.

6. The system of claim 1, wherein the first chip-to-chip interconnect communication unit and the second chip-to-chip interconnect communication unit include a hardware buffer configured to store communication data.

7. The system of claim 1, wherein the interconnect includes a physical interconnection between the first integrated circuit package and the second integrated circuit package.

8. The system of claim 7, wherein the physical interconnection includes an electric wire interconnection.

9. The system of claim 1, wherein the layered communication architecture includes an application layer.

10. The system of claim 9, wherein the layered communication architecture further includes a physical network layer.

11. The system of claim 10, wherein the layered communication architecture further includes a reliability layer.

12. The system of claim 11, wherein the layered communication architecture further includes a message dispatch and reassembly layer.

13. The system of claim 9, wherein the application layer is configured to access a high-bandwidth memory.

14. The system of claim 1, wherein the credit-based data flow control is configured to communicate credit limits between the first integrated circuit package and the second integrated circuit package based on receive buffer sizes of the first integrated circuit package and the second integrated circuit package.

15. The system of claim 1, wherein the credit-based data flow control is configured to communicate and store counts of packets exchanged between the first integrated circuit package and the second integrated circuit package.

16. The system of claim 1, wherein the layered communication architecture supports a retransmission data flow control and the retransmission data flow control is configured to acknowledge receipt of a packet without error and update a counter that tracks a consecutive number of received packets without an error.

17. The system of claim 1, wherein the layered communication architecture supports a retransmission data flow control and the retransmission data flow control is configured to communicate receipt of a packet with an error and cause retransmission of the packet with the error.

18. A method, comprising:
configuring a first integrated circuit package including a first group of one or more artificial intelligence processing units and a first chip-to-chip interconnect communication unit;
configuring a second integrated circuit package including a second group of one or more artificial intelligence processing units and a second chip-to-chip interconnect communication unit; and
establishing an interconnect between the first integrated circuit package and the second integrated circuit package, wherein the first chip-to-chip interconnect communication unit and the second chip-to-chip interconnect communication unit manage ethernet-based communication via the interconnect using a layered communication architecture supporting a credit-based data flow control that updates a total blocks sent counter based on a block size of a sent packet, wherein the interconnect between the first integrated circuit package and the second integrated circuit package includes a direct chip-to-chip connection configured to carry the ethernet-based communication as a direct chip-to-chip communication between the first integrated circuit package as a first chip and the second integrated circuit package as a second chip.

19. A system, comprising:
a first integrated circuit package including a first group of one or more artificial intelligence processing units and a first chip-to-chip interconnect communication unit;
a second integrated circuit package including a second group of one or more artificial intelligence processing units and a switch communication unit, wherein the switch communication unit is configured to provide an intermediate connection point between the first integrated circuit package and at least a third integrated circuit package; and
an interconnect between the first integrated circuit package and the second integrated circuit package, wherein the first chip-to-chip interconnect communication unit and the switch communication unit manage ethernet-based communication via the interconnect using a layered communication architecture supporting a credit-based data flow control that updates a total blocks sent counter based on a block size of a sent packet, wherein the interconnect between the first integrated circuit package and the second integrated circuit package includes a direct chip-to-chip connection configured to carry the ethernet-based communication as a direct chip-to-chip communication between the first integrated circuit package as a first chip and the second integrated circuit package as a second chip.

20. The system of claim 19, wherein the third integrated circuit package includes a third group of one or more artificial intelligence processing units and a second chip-to-chip interconnect communication unit.

* * * * *